(12) United States Patent
Weyer, Jr. et al.

(10) Patent No.: US 9,939,068 B2
(45) Date of Patent: Apr. 10, 2018

(54) FLUID CONTROL APPARATUS HAVING FLOW RESTRICTORS

(71) Applicant: Emerson Process Management Regulator Technologies, Inc., McKinney, TX (US)

(72) Inventors: Thomas LeRoy Weyer, Jr., Frisco, TX (US); Madhusudhan Reddy Kotragouda Basappa, Frisco, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 0 days.

(21) Appl. No.: 14/792,068

(22) Filed: Jul. 6, 2015

(65) Prior Publication Data
US 2017/0010626 A1    Jan. 12, 2017

(51) Int. Cl.
*F16K 1/00*    (2006.01)
*F23N 1/00*    (2006.01)

(52) U.S. Cl.
CPC ............... *F16K 1/00* (2013.01); *F23N 1/002* (2013.01); *F23N 2035/14* (2013.01); *F23N 2035/20* (2013.01)

(58) Field of Classification Search
CPC ....... G05D 16/04; F16K 31/40; F16K 31/402; F16K 31/42; F23N 2035/14; F23N 2035/20; F23N 1/002
USPC ..... 251/30.01, 61, 61.2; 137/605.21, 505.22, 137/505.38, 505.45, 505.41, 505.42, 137/505.39, 493–493.6, 505.21
See application file for complete search history.

(56) References Cited

U.S. PATENT DOCUMENTS

| | | | |
|---|---|---|---|
| 3,477,466 A * | 11/1969 | Sturm | F16K 11/10 137/601.13 |
| 3,593,741 A * | 7/1971 | Odenthal | F16K 17/105 137/491 |
| 3,814,375 A * | 6/1974 | Grotloh | D21D 1/02 251/28 |
| 3,865,128 A | 2/1975 | Zadoo | |
| 4,084,539 A | 4/1978 | Schmidt | |

(Continued)

FOREIGN PATENT DOCUMENTS

| DE | 4038445 | 6/1992 |
|---|---|---|
| WO | 2017007794 | 1/2017 |

OTHER PUBLICATIONS

Emerson Process Management, "Oilfield Burner Pressure Control System," Brochure, Apr. 2015, 6 pages.

(Continued)

*Primary Examiner* — Craig J Price
*Assistant Examiner* — Andrew J Rost
(74) *Attorney, Agent, or Firm* — Hanley, Flight & Zimmerman, LLC (57) ABSTRACT

Fluid control apparatus having flow restrictors are described herein. An example actuator includes an actuator housing having an actuator to define a first chamber of the actuator housing and a second chamber of the actuator housing. A loading fluid pathway is formed in the actuator housing to fluidly couple a loading fluid and the first chamber. A restrictor is positioned within the loading fluid pathway to regulate a flow rate of the loading fluid that is to flow from an inlet port of the loading fluid pathway to the first chamber.

15 Claims, 7 Drawing Sheets

(56) References Cited

U.S. PATENT DOCUMENTS

| | | | | | |
|---|---|---|---|---|---|
| 4,490,836 | A | * | 12/1984 | Grotloh | F01D 17/145 137/599.16 |
| 4,552,330 | A | * | 11/1985 | Grotloh | F01D 21/20 251/25 |
| 4,589,627 | A | * | 5/1986 | Grotloh | F16K 31/363 251/25 |

OTHER PUBLICATIONS

Profire Energy, "The Role of Burner Management," [http://www.profireenergy.com/role-of-bms/], retrieved on Jul. 28, 2015, 4 pages.
Platinum Control, "Quick Connect Unit," [http://platinumcontrol.com/wp-content/uploads/2014/07/Quick-Connect-Unit1.pdf], retrieved on Jul. 28, 2015, 1 page.
ACL Manufacturing Inc., "Valve Trains," [http://acl-manufacturing.com/valve_trains.html], retrieved on Jul. 28, 2015, 3 pages.
Kimray Inc., "High Pressure Control Valves," Manual, Jun. 2014, 7 pages.
Kimray Inc., "Low Pressure Motor Valves," Manual, Jan. 2013, 5 pages.
Emerson Process Management, "Fisher easy-Drive Electric Actuators," Brochure, Apr. 2013, 4 pages.
Canalta Controls Group, "Combustex Burner Ignition and Control Systems," Operations Manual, 2011, 44 pages.
Emerson, "ASCO Redhat," Oct. 2013, Manual, 24 pages.
Peter Paul, "3-Way Normally Closed (exhaust to atmosphere)," Specifications, [http://peterpaul.com/valves/3-way-normally-closed-exhaust-to-atmosphere], retrieved on Jul. 28, 2015, 2 pages.
International Searching Authority, "International Search Report," issued in connection with International Patent Application No. PCT/US2016/041051, dated Oct. 6, 2016, 3 pages.
International Searching Authority, "Written Opinion," issued in connection with International Patent Application No. PCT/US2016/041051, dated Oct. 6, 2016, 6 pages.

* cited by examiner

FLUID CONTROL APPARATUS HAVING FLOW RESTRICTORS

FIELD OF THE DISCLOSURE

The present disclose relates generally to fluid control devices and, more particularly, to fluid control apparatus having flow restrictors.

BACKGROUND

Many process control systems use pressure regulators to control a pressure of a fluid. Pressure reducing regulators are commonly used to receive a relatively high pressure fluid and output a relatively lower regulated output fluid pressure. In this manner, despite the pressure drop across the regulator, a pressure reducing regulator can provide a relatively constant fluid pressure output for a wide range of output loads (i.e., flow requirements, capacity, etc.). For example, a regulator associated with a piece of equipment (e.g., a boiler or burner) may receive a fluid (e.g., fuel or gas) having a relatively high and somewhat variable pressure from a fluid distribution source and may regulate the fluid to have a lower, substantially constant pressure suitable for safe, efficient use by the equipment (e.g., a burner) downstream from the fluid regulator.

SUMMARY

An example actuator includes an actuator housing having an actuator to define a first chamber of the actuator housing and a second chamber of the actuator housing. A loading fluid pathway is formed in the actuator housing to fluidly couple a loading fluid and the first chamber. A restrictor is positioned within the loading fluid pathway to regulate a flow rate of the loading fluid that is to flow from an inlet port of the loading fluid pathway to the first chamber.

An example actuator includes a body to define at least a portion of a loading chamber of the actuator. The body defines a loading fluid pathway having a first inlet and a first outlet and the loading fluid pathway is in fluid communication with the loading chamber. A restrictor is positioned within the loading fluid pathway to restrict fluid flow between the first inlet and the first outlet. A fluid control device is positioned between loading chamber and the first inlet of the loading fluid pathway. The fluid control device has a second inlet in fluid communication with the loading chamber and a second outlet in fluid communication with the loading fluid pathway. The fluid control device is to allow fluid flow from the loading chamber to the loading fluid pathway and is to prevent fluid flow from the loading fluid pathway to the loading chamber.

An example actuator includes means for actuating defining a first chamber and a second chamber, where the first chamber to receive a loading fluid. The means for actuating includes means for fluidly coupling the first chamber of the means for actuating and the loading fluid. The means for actuating further includes means for restricting a flow rate within the means for fluidly coupling the first chamber and the loading fluid, where the means for restricting to restrict a fluid flow rate of the loading fluid flowing to the first chamber via the means for fluidly coupling.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Fluid regulators often receive a supply fluid from an upstream fluid distribution source having a relatively high pressure and regulate the pressure of the supply for use with a downstream demand source, a pressure regulator, or any other custody point that demands process fluid at a desired (e.g., lower) pressure. The example actuators disclosed herein may be employed with fluid regulators to prevent and/or reduce excess gas (e.g., combustible gas) accumulation or build-up, backfire and/or pilot flame blowout during operation (e.g., during an ignition stage of a main burner). To prevent gas build up, backfire and/or pilot flame blowout, the actuators disclosed herein employ a speed flow apparatus to control a rate or speed at which a fluid regulator moves from a closed position (e.g., a fully closed position preventing a supply fluid (e.g., a combustible gas) from flowing toward an outlet) to an open position (e.g., a fully open position allowing fluid flow to the outlet). In some examples, the speed flow apparatus may be adjustable to enable an increase or decrease of the rate or speed at which the fluid regulator moves from the closed position toward the open position. By controlling the speed at which the fluid regulator moves from a closed position to an open position, the example actuators disclosed herein may be used to reduce pilot blow-off and/or back fire that may otherwise occur when a fluid regulator opens too quickly during, for example, an ignition sequence of a burner.

Further, to enable relatively quick shut-off of the example fluid regulators, the actuators disclosed herein employ an exhaust apparatus that is not affected by the speed flow apparatus. Thus, although the speed control apparatus controls a rate at which the fluid regulator moves from the closed position to the open position, the speed control apparatus does not affect a speed at which the fluid regulator moves from the open position to the closed position.

The example actuators disclosed herein may be used to retrofit existing fluid regulators and/or actuators in the field. In other words, the actuators disclosed herein may be provided separately or as individual units. In some examples, only a housing of the example actuators disclosed herein may be provided (e.g., to retrofit existing actuators in the field). Thus, the example actuator apparatus disclosed herein may implement a fluid regulator assembly at the factory or may be provided (e.g., sold) as an independent unit to retrofit existing fluid regulators and/or actuators in the field.

Figure 1:
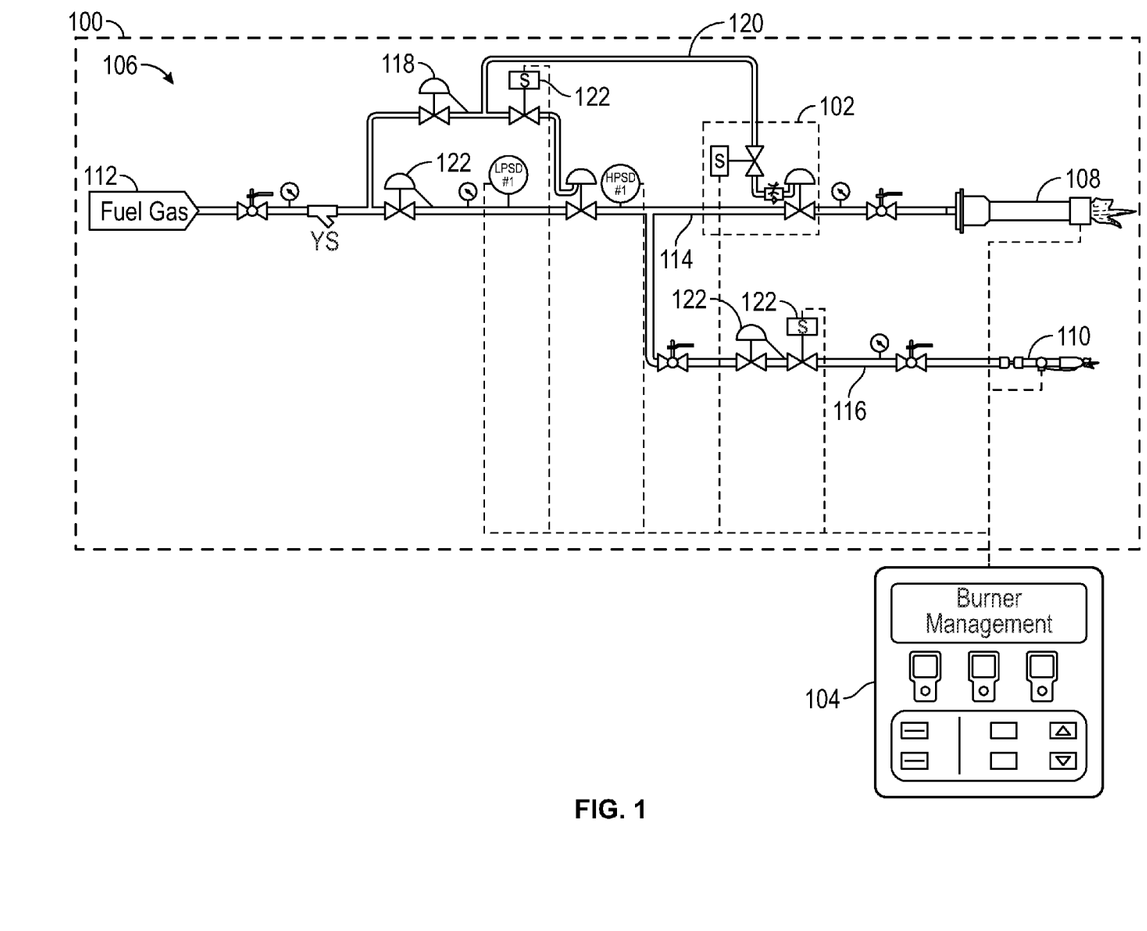
FIG. 1 is a schematic illustration of an example system implemented with an example fluid regulator constructed in accordance with the teachings of this disclosure.

FIG. 1 is a schematic illustration of an example burner system 100 (e.g., a fire tube vessel or direct-fire heater) that may be implemented with an example fluid regulator 102 constructed in accordance with the teachings of this disclosure. For example, the burner system 100 of FIG. 1 may be employed to provide heat to a process fluid of an oil and/or natural gas application or process (e.g., a fuel refining application). The system 100 of the illustrated example employs a burner management system 104 to enable start-up or ignition, operation and/or shut down of a burner section 106 of the burner system 100. The burner section 106 of the example burner system 100 includes a main burner 108 to provide heat to a process fluid and a pilot burner 110 that is used to ignite the main burner 108. The main burner 108 and the pilot burner 110 of the illustrated example receive a supply fluid (e.g., a combustible gas or fuel such as natural gas) from a fuel supply source 112. The main burner 108 is fluidly coupled to the supply source 112 via a main line 114 and the pilot burner 110 is fluidly coupled to the supply source 112 via a pilot line 116. The fluid regulator 102 is fluidly coupled to the main line 114 and controls the supply fluid flow to the main burner 108 based on a loading pressure provided to the fluid regulator 102 by a loading regulator 118 via a loading line 120. The loading fluid has a pressure that is less than a pressure of the supply fluid upstream from the fluid regulator 102 and greater than a pressure of the supply fluid downstream from the fluid regulator 102. The main line 114, the pilot line 116 and/or the loading line 120 may include one or more fluid control components 122 (e.g., fluid regulators and/or solenoid valves) to prevent or restrict the supply fluid flowing to the main burner 108 and/or the pilot burner 110.

In operation, the burner management system 104 monitors and/or manages the ignition, shutdown and/or operation of the main burner 108 to control a temperature of a process fluid to a desired temperature. For example, the burner management system 104 adjusts the heat output of the main burner 108 via the fluid regulator 102 to accurately control a temperature of a process fluid while increasing an efficiency of the burner system 100 during operation. To increase burner efficiency, the burner management system 104 may be configured to manage a user defined temperature setpoint ensuring that the main burner 108 is turned on (e.g., burning fuel) only when needed. For example, the burner management system 104 detects a flame absence (e.g., via a flame sensor such as a flame ionization rod, an ultraviolet or infrared scanner, etc.) of the main burner 108 and ignites the main burner 108 via the pilot burner 110 when additional heat is needed.

The burner management system 104 may employ a processor or logic responsive to process signals (e.g., from a temperature sensor) representative of a temperature of a process fluid that is to be heated by the main burner 108. Based on the received signals, the burner management system 104 provides (e.g., via a wireless or wired connections) control function signals to the various fluid control components 122 and/or the fluid regulator 102 of the burner system 100. For example, if a signal received is indicative of a temperature of a process fluid that is below a threshold temperature, the burner management system 104 causes the main burner 108 to ignite if the burner management system 104 detects a flame absence at the main burner 108. To ignite the main burner 108, the burner management system 104 commands the fluid regulator 102 to move to an open position to allow the supply fluid to flow to the main burner 108. The supply fluid to the main burner 108 is ignited by the pilot burner 110.

To prevent and/or reduce excess gas build up, backfire and/or pilot flame blowout during ignition of the main burner 108, the example fluid regulator 102 of the illustrated example controls a rate at which the fluid regulator 102 moves to an open position to allow the supply fluid to flow to the main burner 108. In this manner, the example fluid regulator 102 of the illustrated example regulates (e.g., via a controller) a rate at which the fluid regulator 102 moves from a closed position to an open position to control to control a flow rate of supply fluid to the main butter 108.

Figure 2:
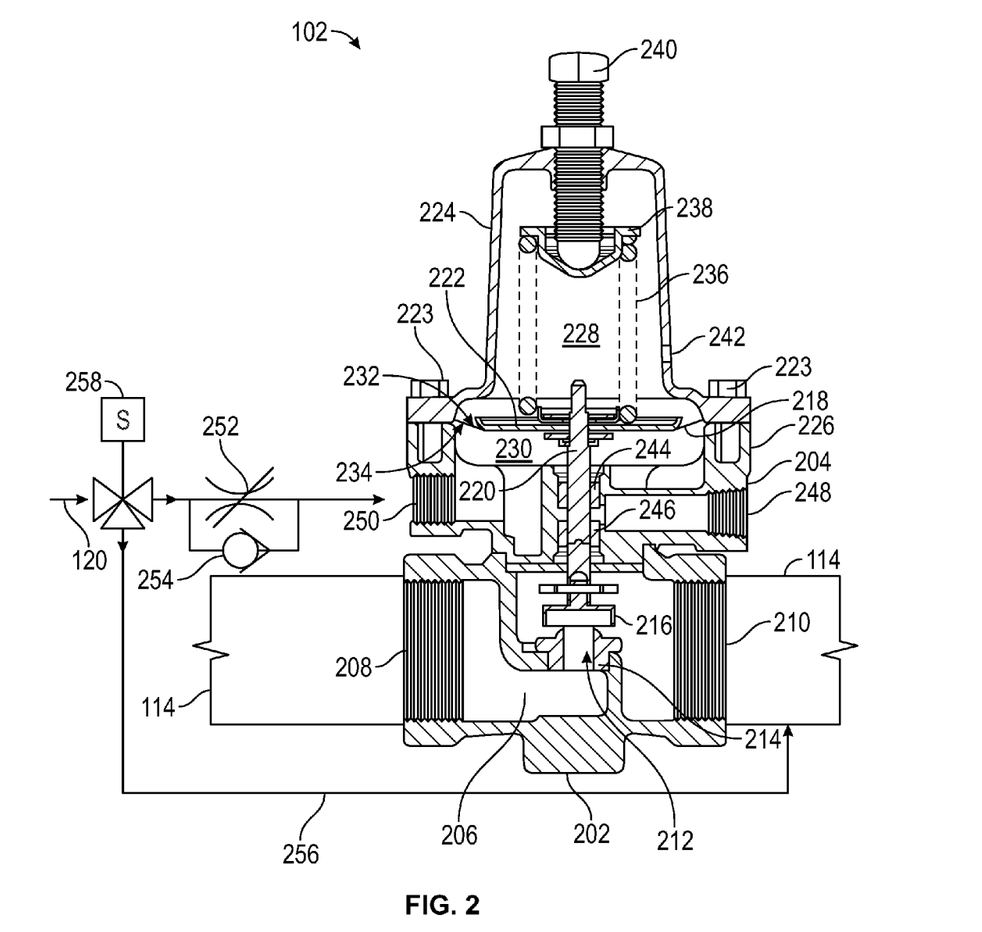
FIG. 2 is a cross-sectional, schematic illustration of the example fluid regulator of FIG. 1.

FIG. 2 is a cross-sectional, schematic illustration of the example fluid regulator 102 of FIG. 1. The fluid regulator 102 of the illustrated example includes a regulator body 202 coupled to an actuator 204. The regulator body 202 defines a fluid flow passageway 206 between an inlet 208 and an outlet 210. The inlet 208, for example, is fluidly coupled to the supply source 112 (FIG. 1) via the main line 114 and the outlet 210 is fluidly coupled to the main burner 108. The fluid flow passageway 206 defines an orifice 212 between the inlet 208 and the outlet 210. The orifice 212 is defined by a valve seat 214 positioned in the fluid flow passageway 206 and removably coupled to the regulator body 202.

The actuator 204 of the illustrated example moves a flow control member 216 (e.g., a valve plug) in the fluid flow passageway 206 adjacent the valve seat 214 to control (e.g., shut-off, throttle, etc.) fluid flow between the inlet 208 and the outlet 210. For example, the actuator 204 moves the flow control member 216 relative to the valve seat 214 between a first position at which the flow control member 216 is sealingly engaged with the valve seat 214 to prevent supply fluid flow between the inlet 208 and the outlet 210 (e.g., a fully closed position), and a second position at which the flow control member 216 is spaced away or disengaged from the valve seat 214 to allow the supply fluid flow between the inlet 208 and the outlet 210 (e.g., an open position). To move the flow control member 216 relative to the valve seat 214, the actuator 204 of the illustrated example includes a diaphragm 218 operatively coupled to the flow control member 216 via a valve stem 220 and a diaphragm plate 222. The diaphragm 218 is captured between a first housing 224 of the actuator 204 and a second housing 226 of the actuator 204 removably coupled to the first housing 224 via fasteners 223. Specifically, a first side 232 of the diaphragm 218 and the first housing 224 define a first chamber 228 (e.g., a spring chamber) of the actuator 204 and a second side 234 of the diaphragm 218 and the second housing 226 define a second chamber 230 (e.g., a loading chamber) opposite the first chamber 228. A biasing element or spring 236 is disposed within the first chamber 228 between the diaphragm plate 222 and an adjustable spring seat 238. A spring adjuster 240 (e.g., a screw) enables adjustment (e.g., an increase or decrease) of an amount of a pre-set force or load that the spring 236 exerts on the first side 232 of the diaphragm 218 to provide a desired pressure set point or outlet pressure. In this example, the first chamber 228 is fluidly coupled to, for example, the atmosphere, via a vent or aperture 242. Additionally, to detect leakage through a seal assembly 244 (e.g., packing) positioned within a bore 246 of the actuator 204 and/or the regulator body 202 through which the valve stem 220 slides, the actuator 202 of the illustrated example includes a leak detection pathway or port 248.

The example fluid regulator 102 includes a loading or inlet port 250 to fluidly couple the loading fluid (FIG. 1) provided by the loading regulator 118 (FIG. 1) to the second chamber 230. To control (e.g., reduce or restrict) a flow rate of the loading fluid to the second chamber 230, the example fluid regulator 102 of the illustrated example includes a controller or speed control device 252 (e.g., a restrictor, a valve, etc.). Also, to enable relatively quick evacuation of the loading fluid from the second chamber 230 (e.g., substantially instantaneously, less than one second, etc.), the fluid regulator 102 includes a fluid control device 254 (e.g., a check valve). In some examples, the fluid control device 254 may be formed or implemented with the speed control device 252. In some such examples, the speed control device 252 may be implemented as a fluid flow restrictor that includes a one-way check valve implemented within the restrictor. In some examples, the fluid control device 254 may be formed as a separate component and/or spaced apart from the speed control device 252. In some such examples, the speed control device 252 may be a restrictor positioned within the second housing 226 between the inlet port 250 and the second chamber 230, and the fluid control device 254 may be a one-way check valve positioned between the second chamber 230 and an exhaust pathway 256.

A solenoid valve 258 (e.g., a three-way solenoid valve) moves between a first position (e.g., a closed position) and a second position (e.g., an open position) to control or allow the loading fluid to flow to the second chamber 230 via the inlet port 250 and the speed control device 252. For example, during ignition of the main burner 108 (FIG. 1), the burner management system 104 of FIG. 1 commands the solenoid valve 258 to move to the second position to allow the loading fluid to flow to the inlet port 250. During shut-off of the main burner 108, the burner management system 104 of FIG. 1 commands the solenoid valve 258 to move between the second position (e.g., the open position) and a third position (e.g., an exhaust position) to enable the loading fluid in the second chamber 230 to exhaust or evacuate from the second chamber 230. The loading fluid is exhausted to the main line 114 downstream of the outlet 210 via the fluid control device 254 and the exhaust pathway 256. In some examples, the solenoid valve 258 may be separate from the regulator body 202, the actuator 204 and/or, more generally, the fluid regulator 102. In some examples, the solenoid valve 258 may be positioned within the regulator body 202, the actuator 204 and/or, more generally, the fluid regulator 102 (e.g., positioned within a dimensional envelope of the regulator body 202, the actuator 204 and/or the fluid regulator 102).

In operation, to ignite the main burner 108, the burner management system 104 of FIG. 1 provides a signal to the solenoid valve 258 to move to a position (e.g., an open position) that allows the loading fluid to flow into the second chamber 230. The speed control device 252, in turn, restricts a rate at which the loading fluid flows into the second chamber 230. In this manner, the second chamber 230 fills at a relatively slow rate compared to a fluid regulator that is not implemented with the speed control device 252. As a result, the loading fluid gradually increases a pressure exerted on the second side 234 of the diaphragm 218 as the loading fluid fills the second chamber 230, causing the flow control member 216 to gradually or slowly move away or disengage from the valve seat 214 as the flow control member 216 moves from a closed position sealingly engaged with the valve seat 214 (e.g., a fully closed position) to an open position spaced away or disengaged from the valve seat 214. For example, the speed control device 252 may be configured or adjusted to cause the flow control member 216 to move between the fully closed position and a fully opened position in approximately 2 seconds to 10 seconds. Such a gradual opening or separation between the flow control member 216 and the valve seat 214 allows the supply fluid to flow across the orifice 212 at a relatively slow rate. By controlling the speed at which the flow control member 216 moves from a closed position to an open position, the fluid regulator 102 reduces or substantially prevents pilot blow-off and/or back fire that may otherwise occur when a fluid regulator opens too quickly and a surge and/or excessive accumulation of the supply fluid flows to the main burner 108 during ignition (e.g., prior to ignition). For example, a surge of supply fluid to the main burner 108 may cause the pilot burner 110 to blow out or extinguish when the fluid regulator 102 moves to the open position too quickly (e.g., pilot light blow-off). In some examples, accumulation and/or excessive supply fluid at the main burner 108 during the ignition stage or start-up may cause a back fire or small explosion. Thus, the example fluid regulator 102 provides a controlled flow rate of supply fluid to reduce or prevent a surge and/or excessive supply fluid when igniting the main burner 108. For example, the fluid regulator 102 may be configured with an opening rate in compliance with Canadian Standards Act section 149.3 (CSA 149.3).

To shut-off the main burner 108, the burner management system 104 provides a signal to the solenoid valve 258 to move to a position (e.g., an exhaust position) that allows the loading fluid in the second chamber 230 to exhaust to the main line 114 via the fluid control device 254 and the exhaust pathway 256. When the second chamber 230 is evacuated or exhausted via the fluid control device 254, a force exerted on the second side 234 of the diaphragm 218 decreases below the pre-set force exerted on the first side 232 of the diaphragm 218 via the spring 236. When the pressure in the second chamber 230 is below the pressure in the first chamber 228, the spring 236 causes the diaphragm 218 to move toward the second chamber 230. In turn, the flow control member 216 moves toward the valve seat 214 to restrict or prevent the supply fluid flow between the inlet 208 and the outlet 210. For example, the flow control member 216 moves from the open position (e.g., a fully open position) to a closed position at which the flow control member 216 sealingly engages the valve seat 214 to prevent supply fluid flow between the inlet 208 and the outlet 210 (e.g., fully closed position). Although the example fluid regulator 102 enables gradual opening of the flow control member 216 from the closed position to the open position via the speed control device 252, the fluid control device 254 enables the flow control member 216 to move from the open position to the closed position substantially instantaneously (e.g., less than 3 seconds, less than one second, etc.). In other words, the flow control member 216 moves from the closed position to the open position at a speed or rate that is significantly slower than a speed or rate at which the flow control member 216 moves from the open position (e.g., a fully open position) to the closed position (e.g., a fully closed position). Thus, the fluid control device 254 provides substantially quick or rapid shut-off capability during, for example, an emergency condition.

Figure 3A:
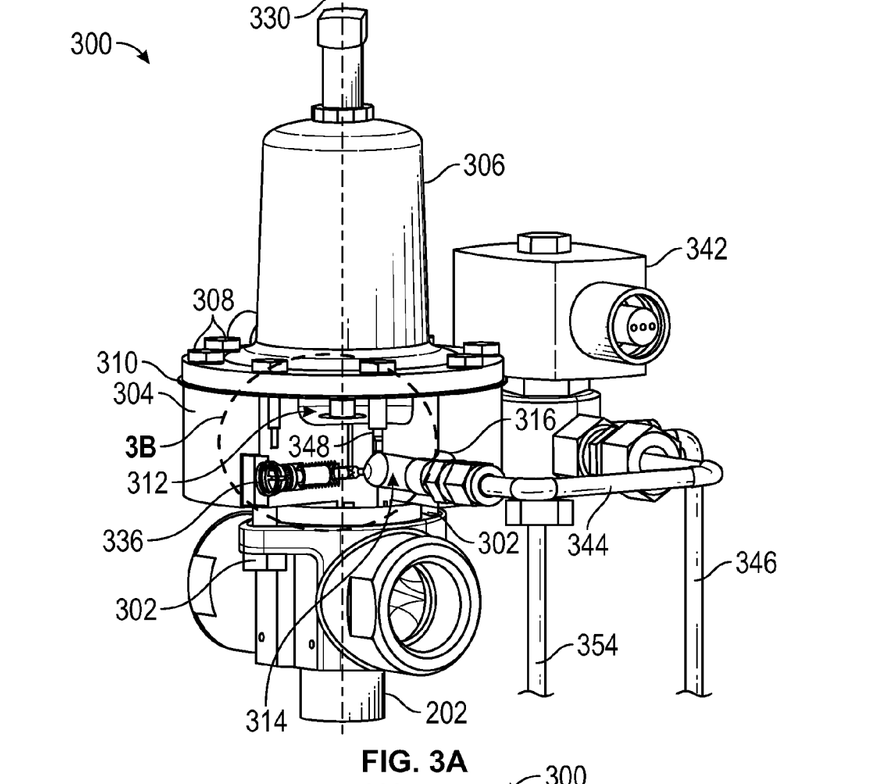
FIG. 3A is a perspective partial cutaway view of an example fluid regulator constructed in accordance with the teachings of this disclosure.
Figure 3B:
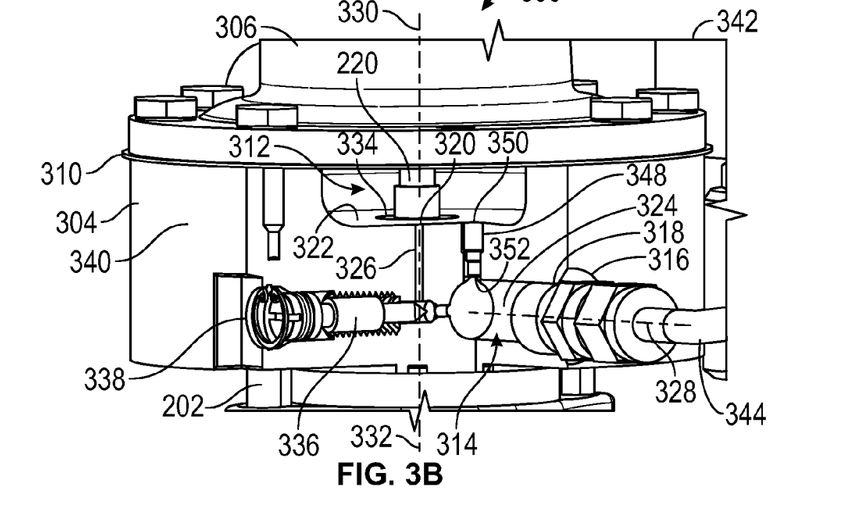
FIG. 3B is an enlarged view of a portion of the example fluid regulator of FIG. 3A.

FIG. 3A is a perspective partial cutaway view of an actuator 300 constructed in accordance with the teachings of this disclosure. For example, the actuator 300 may be used to implement the example fluid regulator 102 and/or the example actuator 204 of FIGS. 1 and 2. FIG. 3B is an enlarged view of a portion of the example fluid regulator 300 of FIG. 3A. Those components of the example actuator 300 that are substantially similar or identical to the components of the example actuator 204 and/or the fluid regulator 102 described above in connection with FIGS. 1 and 2 and that have functions substantially similar or identical to the functions of those components will not be described in detail again below. Instead, the interested reader is referred to the above corresponding descriptions. To facilitate this process, similar reference numbers will be used for like structures.

Referring to FIGS. 3A and 3B, the example actuator 300 is removably coupled to the regulator body 202 via, for example, fasteners 302. The actuator 300 of the illustrated example includes a first housing portion 304 (e.g., body) coupled to a second housing portion 306 (e.g., a cover cap) via a plurality of fasteners 308. An actuation member or diaphragm 310 is positioned between the first and second housing portions 304 and 306 to define a loading chamber 312. In some examples, the actuation member 310 may be a piston and/or any other suitable actuation member.

Referring to FIG. 3B, the first housing portion 304 of the actuator 300 defines a loading fluid pathway 314 to fluidly couple a loading port 316 and the loading chamber 312. The loading fluid pathway 314 of the illustrated example includes a first inlet 318 defined by the inlet port 316 and a first outlet 320 in fluid communication with the loading chamber 312. In this example, the loading pathway 314 is integrally formed in the first housing portion 304 of the actuator 300 and the first outlet 320 is formed in a surface 322 of the first housing portion 304 defining the loading chamber 312. The loading fluid pathway 314 includes a first portion 324 defining the inlet port 316 and a second portion 326 defining the first outlet 320. The first portion 324 of the loading fluid pathway 314 has an axis 328 that is substantially perpendicular relative to a longitudinal axis 330 of the actuator 300 and the second portion 326 has an axis 332 that is substantially parallel relative to the longitudinal axis 330 and/or substantially perpendicular relative to the axis 328. Although the axis 332 is substantially parallel relative to the longitudinal axis 330, the second portion 326 of the loading fluid pathway 314 is laterally offset or spaced from a central opening 334 of the first housing portion 304 that receives the valve stem 220 of the regulator body 202.

To control or regulate a flow rate of a loading fluid flowing to the loading chamber 312 via the loading fluid pathway 314, the actuator 300 of the illustrated example includes a restrictor 336. For example, the restrictor 336 may implement the example speed control device 252 of the example fluid regulator 102 of FIGS. 1 and 2. The restrictor 336 is interposed in the second portion 326 of the loading fluid pathway 314 to control or restrict fluid flow between the inlet port 316 and the loading chamber 312 (e.g., between the first portion 324 of the fluid flow pathway 314 and the first outlet 320). The restrictor 336 of the illustrated example is adjustable via an access port 338 accessible from an outer surface 340 of the actuator 300 or the first housing portion 304. As shown, the access port 338 is recessed relative to the outer surface 340 of the first housing portion 304. Additionally, the inlet port 316 of loading fluid pathway 314 is positioned approximately between thirty degrees and ninety degrees from the access port 338 relative to the longitudinal axis 330. The restrictor 336 is described in greater detail in connection with FIG. 4.

Referring to FIGS. 3A and 3B, a solenoid valve 342 (e.g., a three-way solenoid valve) fluidly couples the inlet port 316 and a loading fluid via tubing or piping 344. The solenoid valve 342 of the illustrated example is positioned adjacent the actuator 300 or upstream from the inlet port 316. In other words, the solenoid valve 342 is positioned outside a dimensional envelope of the actuator 300. The solenoid valve 342 may receive a command (e.g., from the burner management system 104 of FIG. 1) to move between a first position and a second position to enable a loading fluid to flow from a loading line 346 (e.g., coupled to the loading line 120 of FIG. 1) to the inlet port 316 of the actuator 300 via the tubing 344.

To remove the loading fluid from the loading chamber 312, the example actuator 300 includes a fluid control device 348. The fluid control device 348 of the illustrated example is positioned between the loading chamber 312 and the inlet port 316 of the loading fluid pathway 314. In particular, the fluid control device 348 has a second inlet 350 in fluid communication with the loading chamber 312 and a second outlet 352 in fluid communication with the inlet port 316 via the first portion 324 of the loading fluid pathway 314. The solenoid valve 342 may receive a command (e.g., from the burner management system 104 of FIG. 1) to move between the second position and a third position to fluidly couple the inlet port 316 to an exhaust line 354 via the tubing 344. When the solenoid valve 342 is in the third position, the loading fluid from the loading fluid line 346 is blocked to prevent the loading fluid from flowing to the inlet port 316 via the tubing 344. Instead, the loading fluid pathway 314 is fluidly coupled to the exhaust line 354 via the tubing 344 to provide a (e.g., reverse) flow path to exhaust the loading fluid from the loading chamber 312. In particular, the absence of the loading fluid in the first portion 324 of the loading fluid pathway 314 and the presence of the loading fluid in the loading chamber 312 causes a pressure differential across the fluid control device 348 that is greater than a threshold pressure differential. As a result, the fluid control device 348 moves to an open position to exhaust the loading chamber 312 via the tubing 344 and the exhaust line 354. On the other hand, when the first portion 324 of the loading fluid pathway 314 is fluidly coupled to the loading fluid line 346 via the tubing 344, a pressure differential across the fluid control device 348 is less than the pressure differential threshold, thereby causing the fluid control device 348 to move to a closed position and prevent fluid flow across the fluid control device 348 between the loading chamber 312 and the loading fluid pathway 314. The fluid control device 348 is discussed in greater detail in connection with FIGS. 5A and 5B.

Figure 4:
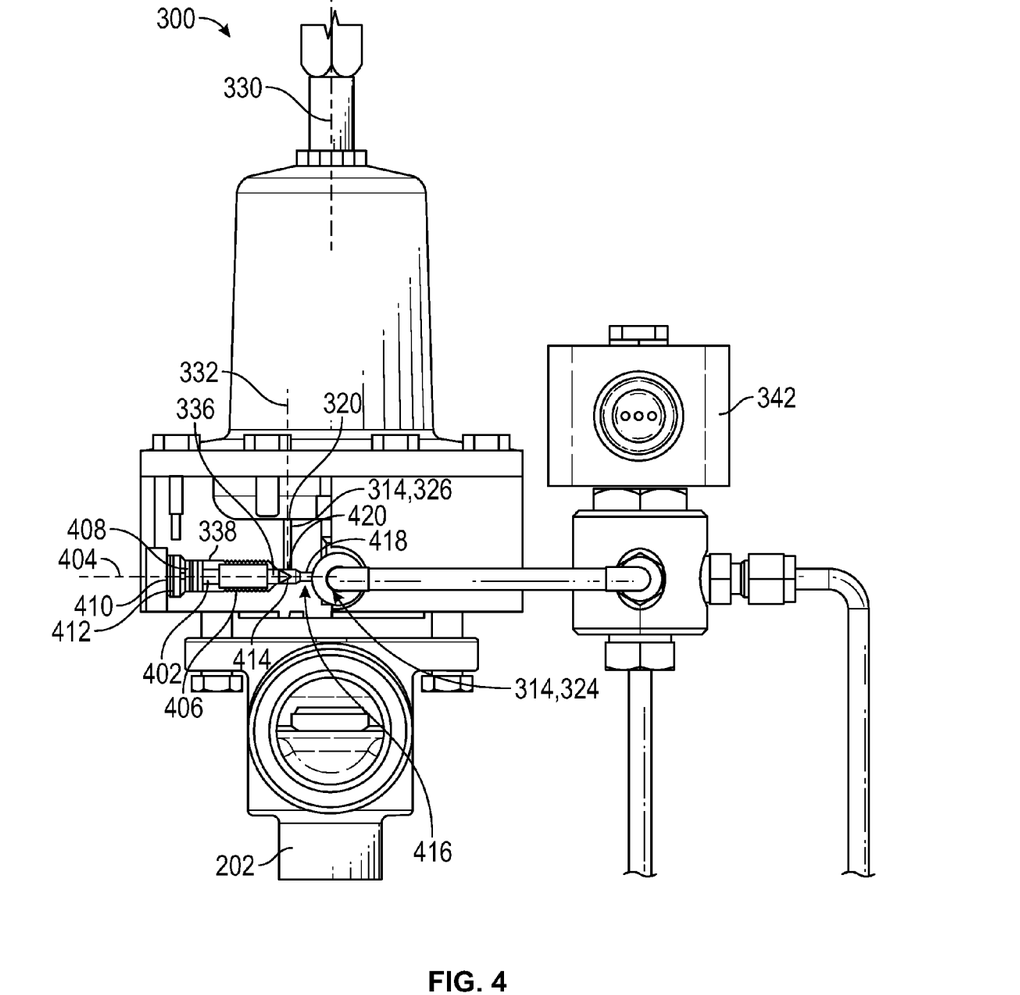
FIG. 4 is a side partial cutaway view of the example fluid regulator of FIGS. 3A and 3B.

FIG. 4 is a side partial cutaway view of the example actuator 300 of FIGS. 3A and 3B. The restrictor 336 of the illustrated example includes a screw 402 having an axis 404 that is substantially perpendicular to the axis 332 of the second portion 326 of the loading fluid pathway 314. The restrictor 336 includes a threaded portion 406 threaded within the access port 338 of the first housing portion 304 to enable a position of the restrictor 336 to move between a first position (e.g., a fully open position) and a second position (e.g., a fully closed position) to vary or adjust a fluid flow rate of the loading fluid flowing to the loading chamber 312 via (e.g., the second portion of) the loading fluid pathway 314. Specifically, the flow rate through the loading fluid pathway 314 may be adjusted between a first flow rate (e.g., a maximum flow rate) when the restrictor 336 is in the first position (e.g., a fully open position) and a second flow rate (e.g., a minimum flow rate) less than the first flow rate when the restrictor 336 is in the second position (e.g., a fully closed position). The restrictor 336 includes a seal 408 to prevent the loading fluid in the second portion 326 of the loading fluid pathway 314 from flowing through an opening 410 of the access port 338. A locking pin 412 retains the restrictor 336 within the access port 338 and prevents the restrictor 336 from being removed (e.g., fully removed) from the access port 338. In some examples, the locking pin 412 limits or prevents movement of the restrictor 336 beyond the first position. In the illustrated example, an end 414 of the restrictor 336 moves within a transition portion 416 of the loading fluid pathway 314 that fluidly couples the first portion 324 and the second portion 326. The transition portion 416 may include a stop 418 to limit or prevent movement (e.g., of the end 414) of the restrictor 336 beyond the second position. In particular, the stop 418 of the transition portion 416 includes a profile or shape that is complementary to a profile or shape of the end 414 of the restrictor 336.

The restrictor 336 may be moved to the first position by rotating the restrictor 336 in a first direction about the axis 404 and the restrictor 336 may be moved to the second position by rotating the restrictor 336 in a second direction about the axis 404 opposite the first direction. In the first position, at least a portion of the end 414 of the restrictor 336 positioned in the transition portion 416 is spaced from an opening 420 of the second portion 326 of the loading fluid pathway 314 to enable fluid flow between the first portion 324 and the second portion 326 of the loading fluid pathway 314. Thus, in the first position, the end 414 of the restrictor 336 uncovers at least a portion of the opening 420 to increase a flow rate of the loading fluid flowing to the loading chamber 312 via the second portion 326 of the loading fluid pathway 314. In the second position, the end 414 of the restrictor 336 is positioned adjacent the opening 420 such that the end 414 obstructs (e.g., at least partially obstructs) or at least partially covers the opening 420 of the second portion 326 of the loading fluid pathway 314. Thus, in the second position, the end 414 of the restrictor 336 obstructs or blocks at least a portion of the opening 420 of the second portion 326 to decrease a flow rate of the loading fluid flowing to the loading chamber 312 via the second portion 326 of the loading fluid pathway 314. In some examples, the restrictor 336 completely blocks or covers the opening 420 when the restrictor 336 is in the second position to prevent fluid flow through the second portion 326 of the loading fluid pathway 314. When the restrictor 336 is in the first position, the increased fluid flow rate of the loading fluid through the second portion 326 increases a speed at which the flow control member 216 (FIG. 1) moves to an open position. When the restrictor 336 is in the second position, the decreased flow rate of the loading fluid through the second portion 326 decreases a speed at which the flow control member 216 (FIG. 1) moves to the open position. The restrictor 336, when positioned in the first position or the second position, causes the flow control member 216 of the regulator body 204 to move from a closed position to an open position at a speed or time that is less than a speed or time at which the flow control member 216 moves from the open position to the closed position.

In some examples, the restrictor 336 may be a fluid control device and/or a solenoid that moves between the first position and the second position. For example, during a loading operation the restrictor 336, when implemented via a solenoid valve, may receive a signal to move to the first position to allow the loading fluid to flow into the loading chamber 312. When exhausting the loading chamber 312, for example, the restrictor 336, when implemented via a solenoid valve, may receive a signal to move to the second position to prevent or significantly restrict fluid flow through the second portion 326 of the loading fluid pathway 314.

Figure 5A:
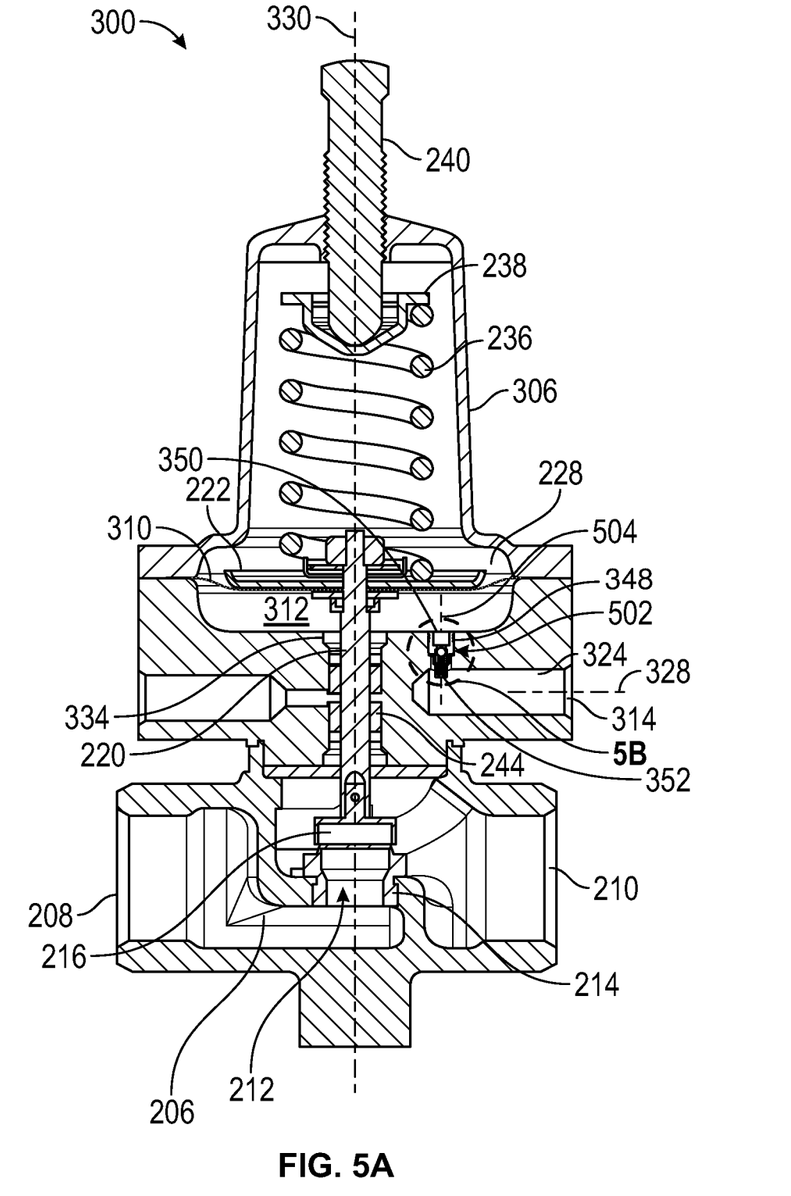
FIG. 5A is a cross-sectional view of an example fluid valve of the example fluid regulator of FIGS. 3A, 3B and 4.
Figure 5B:
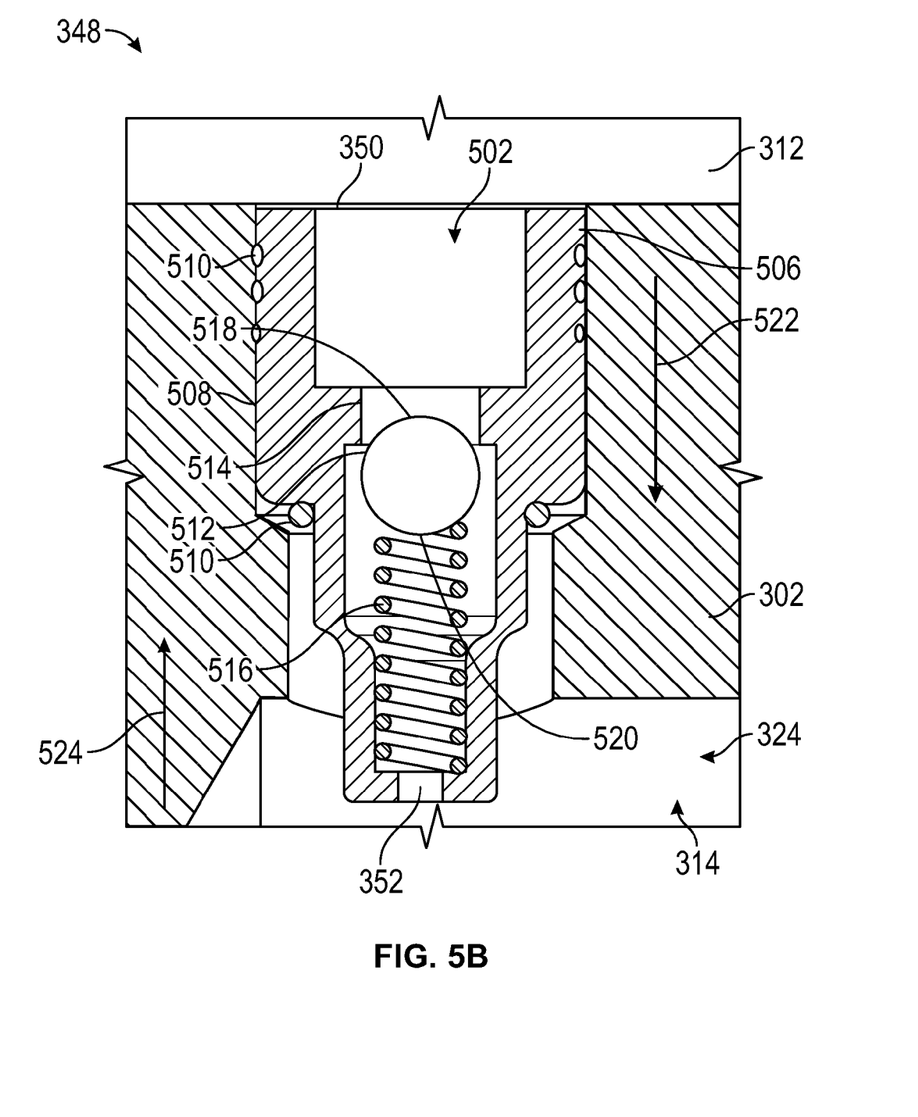
FIG. 5B is a cross-sectional view of the example fluid regulator of FIG. 5A.

FIG. 5A is cross-sectional view of the example actuator 300 and the regulator body 202 of FIGS. 3A, 3B and 4. FIG. 5B is an enlarged portion of the cross-sectional view of the example actuator 300 of FIG. 5A. Referring to FIGS. 5A and 5B, the fluid control device of the illustrated example is a one-way fluid valve (e.g., a check valve). For example, the fluid control device 348 may be a ball check valve. In some examples, the fluid control device 348 may be a solenoid valve and/or any other fluid control device(s) to vent the loading chamber 312.

The fluid control device 348 defines an exhaust passageway 502 between the second inlet 350 in fluid communication with the loading chamber 312 and the second outlet 352 in fluid communication with the first portion 324 of the loading fluid pathway 314. The exhaust passageway 502 of the example fluid control device 348 defines an axis 504 substantially parallel relative to the longitudinal axis 330 and/or substantially perpendicular to the axis 328 of the first portion 324 of the loading fluid pathway 314. In the illustrated example, the axis 504 of the fluid control device 348 is spaced apart or laterally offset relative to the longitudinal axis 330 and/or the central opening 334 of the first housing portion 304. The axis 504 is laterally offset relative to the axis 332 of the second portion 326 of the loading fluid pathway 314.

Referring to FIG. 5B, the fluid control device 348 defines a body 506 positioned within a bore 508 of the first housing portion 304. One or more seals 510 are positioned within the bore 508 between an outer surface of the body 506 and an inner surface of the bore 508 to prevent the loading fluid in the loading chamber 312 from leaking to the first portion 324 of the pathway 314. The fluid control device 348 of the illustrated example includes a flow control member 512 (e.g., a ball) biased toward a seating surface 514 via a biasing element 516 (e.g., a spring). Thus, the biasing element 516 biases the flow control member 512 to sealingly engage the seating surface 514 to prevent fluid flow through the exhaust passageway 502 between the second inlet 350 and the second outlet 352 when the fluid control device 348 is in a closed position.

The fluid control device 348 moves to the closed position to prevent fluid flow through the exhaust passageway 502 when a force or pressure provided on a first side 518 of the flow control member 512 (e.g., in a downward direction 522 in the orientation of FIG. 5B) is less than a force or pressure provided on a second side 520 of the flow control member 512 (e.g., in an upward direction 524 in the orientation of FIG. 5B) opposite the first side. For example, a loading fluid flowing through the loading fluid passageway 314 and a loading fluid in the loading chamber 312 provide substantially equal pressures or forces on the first and second sides 518 and 520 of the flow control member 512, thereby causing the force of the biasing element 516 to move the flow control member 512 into sealing engagement with the seating surface 514. Thus, when the loading fluid is fluidly coupled to the loading chamber 312, the fluid control device 348 is in a closed position to prevent the loading fluid in the loading chamber 312 from flowing toward the first portion 324 of the loading fluid pathway 314.

The fluid control device 348 moves to an open position to allow the loading fluid in the loading chamber 312 to flow to the first portion 324 of the loading fluid pathway 314 when a force or pressure on the first side 518 of the flow control member 512 is greater than a force or pressure on the second side 520 of the flow control member 512 (e.g., provided by the biasing element 516 and a pressure in the first portion 324 of the loading fluid pathway 314). When the loading fluid is removed or prevented from flowing through the first portion 324 of the loading fluid passageway 314, the pressure of the loading fluid in the loading chamber 312 exerts a force on the flow control member 312 that overcomes the force of the biasing element 516. Thus, the fluid control device 348 of the illustrated example allows fluid in the loading chamber 312 to vent when a pressure in the loading chamber 312 is substantially greater than a pressure in the loading fluid pathway 314 (e.g., the first portion of the loading fluid pathway). For example, referring also to FIG. 3A, to move the flow control member 512 to an open position and vent the loading chamber 312, the solenoid valve 342 moves between the second position and the third position to couple the inlet port 316 to the exhaust line 354 via the tubing 344. When the solenoid valve 342 is in the third position, the loading fluid from the loading fluid line 346 is prevented from flowing to the inlet port 316 via the tubing 344. Instead, the loading fluid pathway 314 is fluidly coupled to the exhaust line 354 via the tubing 344. When the exhaust line 354 is coupled to a main line downstream from the outlet 210 (e.g., as shown in FIGS. 1 and 2), the pressure of the supply fluid downstream from the outlet 210 is less than the pressure of the loading fluid. Thus, if the first portion 324 of the loading fluid passageway 314 registers a pressure of the downstream supply fluid via the exhaust line 354, the force of the biasing element 516 and the pressure of the downstream supply fluid (e.g., registered in the first portion 324) is not sufficient to overcome a force provided to the second side 520 of the flow control member 512 by the loading fluid in the loading chamber 312, thereby causing the fluid control member 512 to move away from the seating surface 514 to the open position until the loading fluid is vented from the loading chamber 312. The fluid control device 348 enables the loading fluid to vent from the loading chamber 312 relatively quicker than a rate at which the restrictor 336 enables the loading chamber 312 to fill with the loading fluid. In this manner, the fluid control device 348 enables the flow control member 216 to move from the open position to the closed position significantly faster (e.g., almost instantaneously, less than one second, less than 3 seconds, etc.) than a speed or time at which the restrictor 336 enables the flow control member 216 to move from the closed position to the open position (e.g., greater than 3 seconds, between about 3 seconds and 10 seconds, etc.).

Figure 6:
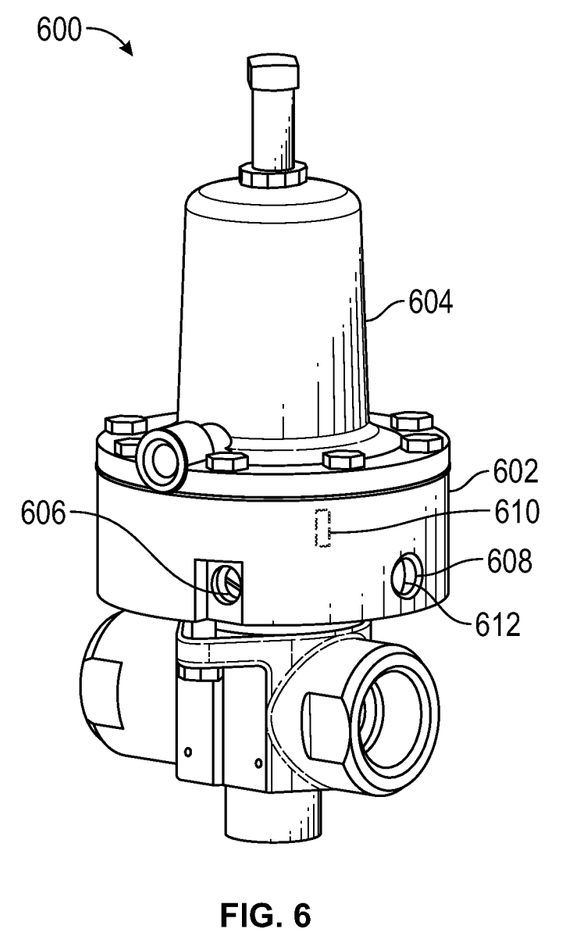
FIG. 6 illustrates another example fluid regulator constructed in accordance with the teachings of this disclosure.

FIG. 6 illustrates another example actuator 600 configured in accordance with the teachings of this disclosure. For example, the example actuator 600 may implement the example fluid regulator 102 of FIGS. 1 and 2. The example actuator 600 of the illustrated example includes a first housing portion 602 coupled to a second housing portion 604. The first housing portion 602 includes a speed control device or restrictor 606 to control a flow rate of a loading fluid flowing between an inlet port 608 and a loading chamber defined by the actuator 600. Additionally, the actuator 600 includes a flow control device 610 (e.g., a check valve similar to the fluid control device 348) positioned within the actuator 600 to vent the loading chamber of the example actuator 600. The loading chamber may be exhausted through the inlet port 608 or another exhaust pathway not passing through the inlet port 608. Further, a solenoid valve 612 (e.g., the solenoid valve 258) is positioned inside the actuator 600 between the inlet port 608 and the loading chamber (e.g., the second chamber 230 or 312). In other words, the solenoid valve 612 is positioned within a dimensional envelope of the actuator 600.

In some examples, the example actuators 204, 300 and/or 600 disclosed herein may be factory assembled with the regulator body 202. In some examples, the example actuators 204, 300 and/or 600 and/or the example second housing 226 or the first housing portions 304 and/or 602 may retrofit existing regulators and/or fluid control devices in the field. Thus, the example actuators 204, 300 and/or 600 and/or the example second housing 226 or the first housing portions 304 and/or 602 disclosed herein may be provided as components to retrofit existing fluid regulators and/or other fluid control devices.

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. A actuator comprising:
an actuator housing including:
an actuator to define a first chamber of the actuator housing and a second chamber of the actuator housing;
a biasing element disposed in the second chamber;
a loading fluid pathway formed in the actuator housing to fluidly couple a loading fluid and the first chamber; and
a restrictor positioned within the loading fluid pathway to regulate a flow rate of the loading fluid that is to flow from an inlet port of the loading fluid pathway to the first chamber, the restrictor being adjustable via an access port adjacent an outer surface of the actuator housing.

2. The actuator as defined in claim 1, further comprising a check valve positioned between the first chamber and the inlet port.

3. The actuator as defined in claim 2, wherein the check valve has a second inlet in fluid communication with the first chamber and a second outlet in fluid communication with the inlet port.

4. The actuator as defined in claim 3, wherein the check valve allows the loading fluid in the first chamber to flow to the inlet port when a pressure differential across the check valve exceeds a threshold.

5. The actuator as defined in claim 1, further comprising a solenoid valve coupled to the inlet port, the solenoid valve to control flow of the loading fluid to the first chamber via the inlet port.

6. The actuator as defined in claim 5, wherein the solenoid valve is positioned upstream from the inlet port.

7. The actuator as defined in claim 5, wherein the solenoid valve is to move between a first position and a second position to allow the loading fluid to flow through the inlet port to the first chamber.

8. The actuator as defined in claim 7, wherein the solenoid valve is to move between a second position and a third position to allow the loading fluid in the first chamber to exhaust via the inlet port.

9. The actuator as defined in claim 1, further comprising a regulator body coupled to the actuator, the regulator body defining a fluid flow passageway between a first inlet and a first outlet, and a flow control member disposed in the fluid flow passageway to move relative to an orifice of the regulator body to control a fluid flow through the fluid flow passageway, wherein the actuator is to move the flow control member relative to the orifice when the actuator is coupled to the regulator body.

10. The actuator as defined in claim 9, wherein the biasing element is to cause the fluid flow control member to sealingly engage a valve seat defining the orifice when a pressure of the loading fluid in the second chamber is less than a pressure imparted to the actuator by the biasing element.

11. The actuator as defined in claim 9, wherein the restrictor is adjustable between a first position to increase a time in which the flow control member moves to an open position relative to the orifice and a second position to decrease the time in which the flow control member moves to the open position relative to the orifice.

12. The actuator as defined in claim 1, wherein the restrictor is adjustable between a first position and a second position to vary an amount of fluid flow restriction through the loading fluid path.

13. An actuator comprising:
  means for actuating defining a first chamber and a second chamber, the first chamber to receive a loading fluid, the means for actuating including:
    means for biasing the means for actuating, the means for biasing positioned in the second chamber;
    means for fluidly coupling the first chamber of the means for actuating and the loading fluid, the means for fluidly coupling having a first inlet to receive the loading fluid and a first outlet in fluid communication with the first chamber;
    means for restricting a flow rate positioned in the means for fluidly coupling the first chamber and the loading fluid, the means for restricting to restrict a fluid flow rate of the loading fluid flowing to the first chamber via the means for fluidly coupling;
    means for discharging the loading fluid from the first chamber, the means for discharging being positioned in the means for actuating, the means for discharging having a second inlet in fluid communication with the first chamber and a second outlet in fluid communication with the first inlet of the means for fluidly coupling; and
  means for controlling the loading fluid, the means for controlling the loading fluid being movable between a first position and a second position to provide loading fluid to the first chamber via the means for fluidly coupling, the means for controlling the loading fluid being movable between the second position and a third position to exhaust the loading fluid from the first chamber via the means for discharging and a portion of the means for fluidly coupling between the second outlet and the first inlet.

14. The actuator of claim 13, further comprising means for supplying the loading fluid to the first chamber, the means for supplying being coupled to the means for fluidly coupling.

15. The actuator of claim 13, further comprising means for defining a fluid flow passageway between a main inlet and a main outlet and means for modulating fluid flow through the fluid flow passageway, the means for actuating to move the means for modulating the fluid flow relative to means for sealing of the fluid flow passageway.

* * * * *